United States Patent [19]

Pape et al.

[11] Patent Number: 5,047,863
[45] Date of Patent: Sep. 10, 1991

[54] DEFECT CORRECTION APPARATUS FOR SOLID STATE IMAGING DEVICES INCLUDING INOPERATIVE PIXEL DETECTION

[75] Inventors: David D. Pape, Framingham; Wanda T. Reiss, Lexington, both of Mass.

[73] Assignee: Polaroid Corporation, Cambridge, Mass.

[21] Appl. No.: 528,123

[22] Filed: May 24, 1990

[51] Int. Cl.⁵ .............................................. H04N 3/14
[52] U.S. Cl. ......................... 358/213.16; 358/213.17
[58] Field of Search .................... 358/213.17, 213.16, 358/213.15

[56] References Cited

U.S. PATENT DOCUMENTS

| | | | |
|---|---|---|---|
| 4,179,711 | 12/1979 | Nagumo | 358/213.16 |
| 4,200,939 | 4/1980 | Hofmann | 358/163 |
| 4,216,503 | 8/1980 | Wiggins | 358/213.16 |
| 4,237,488 | 12/1980 | Takemura | 358/213.17 |
| 4,589,028 | 5/1986 | Ochi | 358/213 |
| 4,590,520 | 5/1986 | Frame et al. | 358/163 |
| 4,602,291 | 7/1986 | Temes | 358/213.17 |
| 4,701,784 | 10/1987 | Matsuoka et al. | 358/213.17 |
| 4,734,774 | 3/1988 | Skaggs et al. | 358/213.15 |
| 4,739,495 | 4/1988 | Levine | 358/213.17 |
| 4,786,969 | 11/1988 | Shouji et al. | 358/213.16 |
| 4,802,011 | 1/1989 | Bremmer et al. | 358/213.15 |
| 4,805,023 | 2/1989 | Younse et al. | 358/213.17 |
| 4,843,473 | 6/1989 | Bencuya et al. | 358/213.18 |
| 4,858,013 | 8/1989 | Matsuda | 358/213.17 |

FOREIGN PATENT DOCUMENTS 56-44274  4/1981  Japan .............................. 358/213.17

Primary Examiner—Howard W. Britton
Assistant Examiner—Wendy R. Greening
Attorney, Agent, or Firm—Edward S. Roman

[57] ABSTRACT

A defect correction apparatus for a solid state imaging device employs a frame buffer responsively coupled to the imaging device for storing digital values of shuttered dark pixel data from image locations of the imaging device. A register responsively coupled to the imaging device and having an output coupled to the buffer sequentially clocks digital values of image pixel data of the imaging device into the frame buffer. A comparator having an output operatively coupled to the register and being responsively coupled to the dark pixel data of the frame buffer produces enable and inhibit outputs. When any selected element of dark pixel data is less than a threshold, indicative of an operative pixel element in the imaging device, data stored in the register corresponding to the pixel is stored in the frame buffer in response to the enable signal. When the value of the dark pixel data in the frame buffer is greater than the threshold the comparator produces an inhibit signal. The value of image data of a previous operative pixel element is thereby entered into the register and frame buffer.

8 Claims, 2 Drawing Sheets

DEFECT CORRECTION APPARATUS FOR SOLID STATE IMAGING DEVICES INCLUDING INOPERATIVE PIXEL DETECTION

BACKGROUND OF THE INVENTION:

1. Field of the Invention

This invention relates generally to a system and method of defect correction in solid state imagers and, more particularly, to charge coupled device (CCD) and charge injection device (CID) imagers employing a pixel correction circuit with reduced memory requirements.

2. Description of the Prior Art

Charge coupled imaging devices and charge injection imaging devices comprising a plurality of photosensitive elements arranged in a matrix of rows and columns are well known in the art. Each of the photosensitive elements comprises row and column electrodes. All of the row electrodes in each row are in common connection with respect to each other, and all of the column electrodes in each column are in common connection with respect to each other also. Incident scene light operates to photogenerate minority charge carriers in potential wells under each pair of electrodes in each photosensitive element. The photogenerated charges may be transferred out of the imager as a pulse train of analog voltages by well known scanning techniques. The analog signals may thereafter be color or gamma corrected digitized and stored in a buffer memory.

A variety of techniques are known for correcting defects in a video output signal from an image sensing device such as a photosensor array. Matsuoka et al., U.S. Pat. No. 4,701,784, employs complex averaging and correlation circuits in one embodiment for using signals or pixels around the defective one. The patent also mentions known correction methods in which a memory is employed to store the position of defects while image data is used in the correction process.

In Frame et al, U.S. Pat. No. 4,590,520, dead spots within a photo array are detected based upon excessive rate of change in sequentially accessed prestored digital sensitivity correction coefficients corresponding to the array of photosensitive elements. The leading and trailing edges of dead spots are detected by comparing arithmetic differences between successive correction coefficients to predetermined threshold values. In one embodiment the last video signal value is employed to fill in the dead spots.

Bremmer, U.S. Pat. No. 4,802,011, describes a correction circuit in which a defective picture pickup element is replaced by a proceeding, non-defective picture pickup element employing a signal sampling circuit and a real time video signal.

Youse et al., U.S. Pat. No. 4,805,013, produces bad pixel data by exposing the imager to 50% full well. The bad pixel location is stored in a PROM. Circuitry inhibits bad pixel data from being utilized and uses PROM pixel data instead.

Bencuya et al., U.S. Pat. No. 4,843,473, assigned to the assignee herein, describes a charge injection device with low noise readout in which KTC and fixed pattern noise are subtracted from the signals retrieved from the charge injection imaging device.

U.S. Pat. No. 4,734,774 describes a CCD image defect compensation circuit in which adjacent streams of data are compared and corrected by replacement of adjacent data.

Similarly, methods have been devised in which a threshold detector looks at the combined image pulse and the fixed pattern noise (or dark current) of the pixel. If a given threshold is exceeded the pixel information is discarded and some other value is substituted therein. An example of such an approach is shown in Endo et al., U.S. Pat. No. 4,567,525. A problem with this approach is similar to that encountered with frequency sensitive systems in which a sharp transition or increase in the pixel response may be due to a line in the picture as opposed to a bad element.

Various on-line approaches to correct pixel defects have been attempted including approaches in which the frequency or amplitude characteristic of successive pixel signals or pulses is examined. For example, Farnside, U.S. Pat. No. 4,535,359 and Scaggs, U.S. Pat. No. 4,734,774, describe various methods in which the leading and trailing edges of the pulses are sampled. An abrupt change in pulse height may be indicative of a defective pixel. The problem with such approaches is that there may be a contrasting element or an image line in the pixel which results in a sharp change in the pixel intensity. Accordingly, such methods are not always effective if the contrast is very high and the pulse transition is sharp (indicative of a high frequency pulse).

Some of the described prior arrangements employ circuitry which is complicated and requires additional storage devices for handling the defect information. Some arrangements sense the real time image data signals in order to determine whether a defect exists even though image data varies from image scene to image scene. It is thus difficult to correlate or correct for the defects, especially in cases where the defect do not always appear. For example, as scene light changes or as temperature varies.

Therefore, it is a primary object of the invention to provide a defect correcting apparatus for a CID or CCD imaging device in which defect correction is independent of the incident scene light.

It is a further object of the invention to provide a defect correction apparatus requiring reduced memory storage.

Other objects of the invention will be in part obvious and will in part appear hereinafter. The invention accordingly comprises a system possessing the construction, combination of elements and arrangement of parts which are exemplified in the following detailed disclosure.

SUMMARY OF THE INVENTION

The present invention is devised to obviate the shortcomings of the prior art by producing an online or real time method of detecting bad pixels without ambiguity. In accordance with the invention if dark pixel data from an imaging device does not exceed a threshold indicative of a defect, the pixel data from the scene is stored in a buffer. If the dark pixel data exceeds a threshold the image scene data from a prior pixel is entered in the buffer whereby pixel correction is achieved.

A defect correction apparatus for a solid state imaging device comprises a frame buffer responsively coupled to the imaging device for storing digital values of shuttered dark pixel data from image locations of the imaging device. A register responsively coupled to the imaging device and having an output coupled to the frame buffer sequentially clocks digital values of image pixel data of the imaging device into the frame buffer. A comparator having an output operatively coupled to the register and being responsively coupled to the dark pixel data of the frame buffer produces enable and inhibit outputs. When any selected element of dark pixel data is less than a threshold, indicative of an operative pixel element in the imaging device, data stored in the register corresponding the pixel is stored in the frame buffer in response to the enable signal. When the value of the dark pixel data in the frame buffer is greater than the threshold the comparator produces an inhibit signal. The value of image data of a previous operative pixel element is thereby entered into the register and frame buffer.

DESCRIPTION OF THE DRAWINGS

The novel features that are considered characteristic of the invention are set forth with particularly in the appended claims. The invention itself, however, both as to its organization and its method of operation together with other objects and advantages thereof will be best understood from the following description of the illustrated embodiment when read in connection with the accompanying drawings wherein:

DESCRIPTION OF THE PREFERRED EMBODIMENTS

Figure 1:
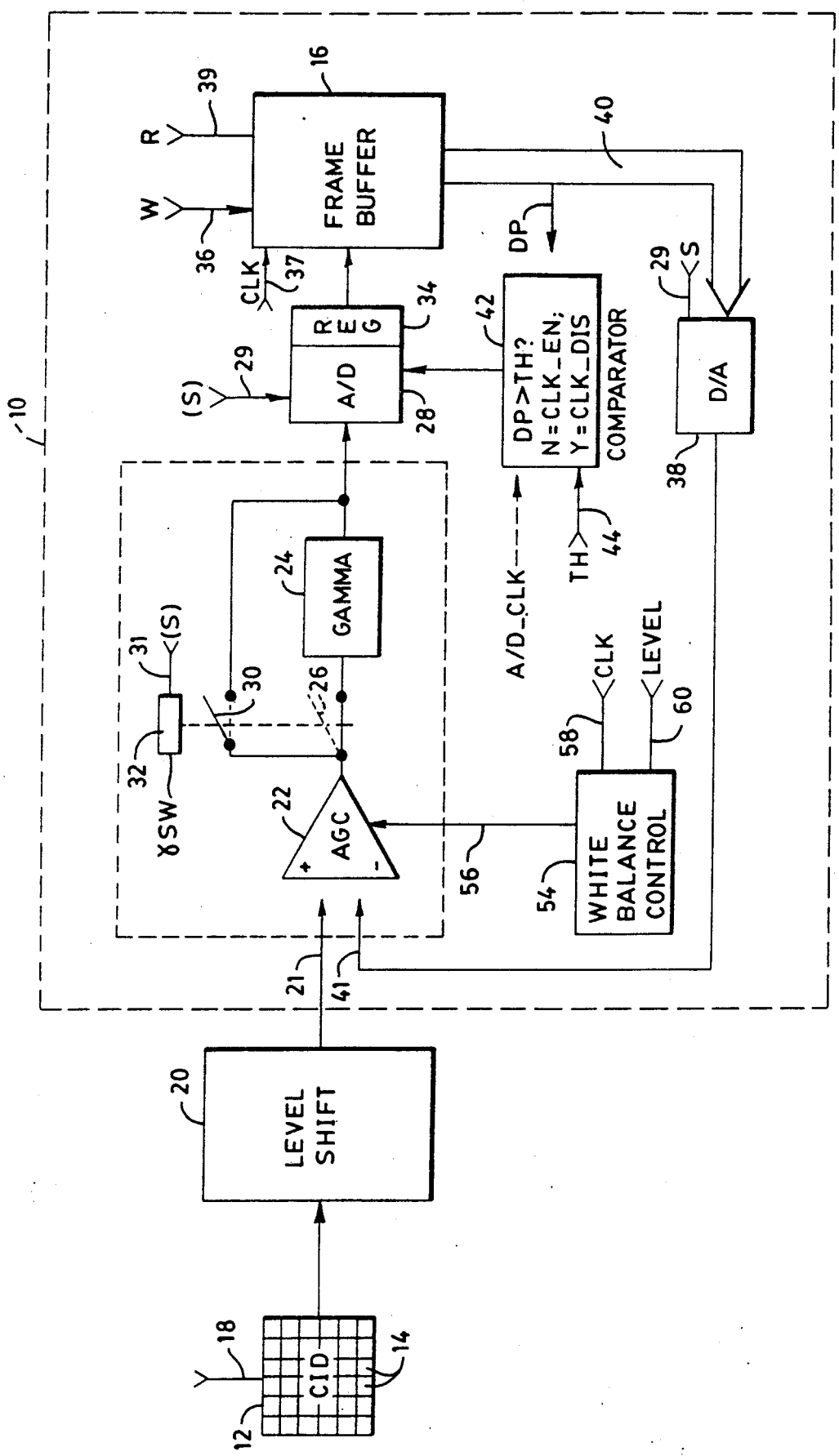
FIG. 1 is a schematic block diagram incorporating a defect correction circuit for a CID imager according to the present invention.

Referring now to FIG. 1, there is shown generally at 10 a circuit for detecting and correcting for pixel defects in a charge injection device 12 (CID) in the form of an array of light sensitive elements or pixels 14. In accordance with the invention an absolute measure of the dark current or fixed pattern noise associated with each pixel 14 in the CID 12 is first established by shuttering the CID 12 and reading dark pixel data of each pixel 14 produced thereby into a frame buffer 16. A digital representation of the dark current of each pixel 14 is stored in the frame buffer 16 at addresses corresponding to the location of each pixel 14 in the CID array 12. When the CID 12 is subsequently exposed to incident scene light, pixel data from the CID is input to the frame buffer 16 on a pixel by pixel basis for each corresponding location therein. If the dark current data stored in the frame buffer 16 at any particular pixel location exceeds a given threshold indicative of a bad or defective pixel, image scene data from the prior pixel is substituted therefor in the frame buffer.

Operation of the apparatus of the present invention illustrated in FIG. 1 proceeds as follows. The CID 12 is shuttered and dark current signals in the CID are allowed to stabilize for a selected period of time, for example, 30 microseconds. Clock pulses to input 18 cause the CID 12 to clock out analog pixel data on a pixel by pixel basis to a level shifting device 20 which matches the voltage or current produced by the CID 12 to the correction circuitry 10. The output of the level shifting device 20 is coupled to the non inverting (+) input 21 of an automatic gain control amplifier (AGC) 22. The output 23 of the AGC 22 is coupled alternately to a gamma correction circuit 24 through a switch contact 26 or directly to an analog to digital converter (A/D) 28 via switch contact 30. The contacts 26 and 30 are alternately opened and closed by a gamma switch control 32 governed by a gamma clock input 31. The pixel data is converted by A/D 28 to a digital value for storage in an output register 34. The output register 34 is coupled to the frame buffer 16 for clocking in digital values of the CID pixels 14 in accordance with pulses on write input (W) 36 and clock input 37 of the frame buffer 16.

A digital to analog converter (D/A) 38 is coupled to the output 40 of frame buffer 16 and senses the dark current data stored therein for each address on a pixel by pixel basis in accordance with pulses on read input (R) 39 and clock input 37. The D/A 38 converts the digital value of the dark current produced by the frame buffer 16 to an analog signal and couples the analog signal to the inverting (−) input 41 of the AGC amplifier 22 as shown. Each time the analog data from the CID 12, representative of a subsequently exposed image scene for any selected pixel 14, is coupled to the AGC 22 the corresponding data representative of dark current from D/A 38, is coupled to the AGC 22. The two analog signals are subtracted whereby only the net data representative of the image scene light may be converted to a digital value in A/D 28 and subsequently stored in the frame buffer 16, provided the dark current data meets a required threshold criterion discussed hereinafter.

A comparator 42, operatively coupled to A/D 28, is responsive to dark pixel (DP) data stored in the frame buffer 16 and to a threshold (Th) 44. If the dark pixel data does not exceed the threshold, the A/D 28 is enabled. More specifically, the output register 34 is clocked to receive therein the digital value of the image scene data. As a result, the digital data produced by A/D 28 is stored in the register 34, thereby replacing any data currently stored therein. Information in the output register 34 is read into frame buffer 16 in response to a write pulse 36.

If the dark pixel data exceeds the threshold, the A/D 28 is inhibited, that is, output register 34 is not clocked. Therefore, the current data representation of the prior pixel is retained in the register 34 and thereafter read into the frame buffer 16. Thus, if a particular pixel (n) is defective, the data from the previous pixel (n−1) is substituted for the actual data produced by such defective pixel.

In accordance with the invention, a picture is taken by exposing the imager 12 to scene light in which photogenerated charges are produced and stored as analog pixel data. The imager 12, in response to clock pulses 18 produces a stream of analog image pulses representative of the pixel data for each pixel 14. Under normal conditions the image scene data from each pixel 14 location 1, 2, 3 ..., n−1, n is sequentially converted to digital values at A/D converter 28 and thereafter stored in output register 34 on a pixel by pixel basis prior to entry to frame buffer 16. If the output register 34 has current (n−1) scene data stored therein, when the A/D 28 and output register 34 is next enabled and clocked, new digital data for the next pixel in the sequence, namely (n), is clocked into register 34. A/D 28 and register 34 are respectively enabled and clocked only if the comparator 42 produces an enable pulse in response to a dark pixel (DP) input which is less than the threshold (Th). Otherwise the current data (n−1) remains in the output register 34 and current data (n) is discarded. In other words, if DP<Th, then the output 46 of comparator 42 enables A/D 28 and the register 34 is clocked. As a consequence, image scene data from the n pixel location is clocked in to register 34 and thereafter replaces the dark pixel DP from the n location in the frame buffer 16. If DP>Th then, the comparator output 46 disables A/D 28 and the register 34 is not clocked. As a consequence the current image scene data from the n−1 location of the image scene stored in the output register 34 replaces the dark pixel DP for the n location in the frame buffer 16. As a result, the data from a defective pixel will be replaced by data from its previous operative neighbor.

A white balance control circuit (WBC) 54 has an output 56 coupled to the AGC 22 as shown. Clock input 58 and level set input 60 coupled to inputs of the WBC 54 receive appropriately timed signals in order to vary the gain or level of the AGC 22 in accordance with known techniques. For example, as is often typical for a color scene the first line of pixels 14 in the CID 12 represents the red, the next line the blue and the next line the green. Accordingly, the WBC 54 output 56 is level shifted to the appropriate level on a line by line basis. The appropriate level set input 60 may be a preselected fixed value for each line. Alternatively, level set 60 may be variable and set by a device responsive to the particular scene condition, for example, a light meter, not shown. Pulses to the clock input 58 drive the white balance control 54 and thereby enable it to change the gain of the AGC on a line-by-line basis as described or, if desired, on a pixel by pixel basis.

Figure 2:
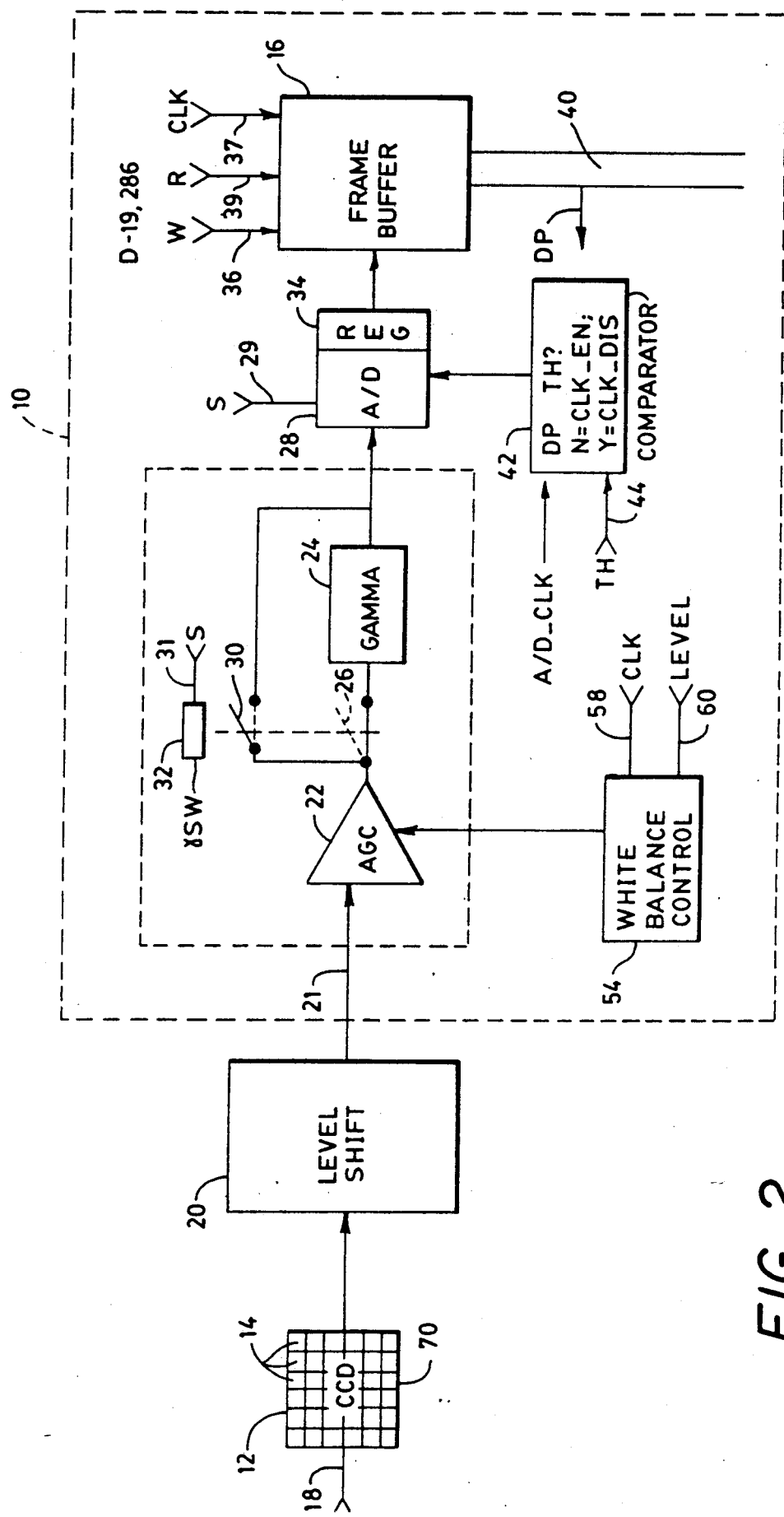
FIG. 2 is a schematic block diagram of a defect correction circuit for a CCD imager according to the present invention.

The arrangement of FIG. 2, in which similar elements are referred to by the same reference numbers referred to in FIG. 1, employs a charge coupled device (CCD) imager 12. Operation of the arrangement in FIG. 2 is the same as FIG. 1 except that a dark current correction signal is not provided to the inverting input of AGC 22, because CCDs produce less dark current and, therefore, it may not be necessary to provide such correction. However, in accordance with teachings of the invention dark currents above an appropriate threshold are indicative of a defective pixel and the prior pixel data is substituted therefor when required.

Sequencing of the arrangement of FIG. 1 is hereinafter described. During a first period for each pixel 14 in the CID 12 a shuttering pulse is produced which charges the CID to a dark pixel level indicative of zero scene light. The signal is level shifted at 20 to an appropriate level and coupled to AGC 22 via its non inverting input 21 and thence through closed switch 30 directly to the A/D converter 28. During the shuttering period the gamma switch 32 is actuated by shutter pulse (S) so that switch 30 is closed and switch 26 is opened thereby bypassing the gamma control 24. The analog pixel data is digitized in A/D converter 28, and stored in the register 34. During the period of shuttering the A/D converter 28 is always enabled by shutter pulse (S) and input 29 so that all dark pixel DP data (1, 2, 3 ... n) for each corresponding pixel 14 is clocked into the frame buffer 16 regardless of its level. Similarly, and at the same time, the inverting input 41 to the AGC 22 is open by a shutter pulse (S) to D/A clock input 29 so that dark current data is coupled directly to the frame buffer 16 without adjustment.

After all the data from the pixels 14 of the CID 12 is read into the frame buffer 16 the CID 12 may be exposed to image scene light. During this phase of operation, the image scene pixel data is coupled to the correction circuit 10 via the level shift circuit 20 as aforesaid. The gamma control switch 32 may be actuated by the absence of the (S) pulse to its enable input 31 so that the switch 30 is open and switch 26 is closed. Accordingly, the output of the AGC 22 is coupled via the gamma correction circuit 24 to the A/D converter 28. At the same time the D/A converter 38 (is enabled by the absence of the (S) pulse) and dark current DP pixel data appearing at the output 40 of the frame buffer 16 is converted to an analog signal by D/A 38 which signal is input to the inverting input 41 of AGC 22. The net gamma corrected signal, namely the image scene data minus the dark current DP is analog-to-digital converted by A/D 28 for storage in the frame buffer 16. The dark current data DP from the frame buffer 16 at the same time is read by the comparator 42 and compared to the threshold Th. A/D converter 28 is, as a consequence, either enabled or disabled depending upon the level of the dark current data. When enabled, the analog value of the n pixel data is converted to a digital value and is clocked into register 34 for entry into buffer 16. If the pixel is defective the A/D converter 28 is not enabled and the register 34 is consequently not clocked. Accordingly, the n-1 data currently in the register 34 is read into the frame buffer 16 for the n location. The comparator 42 and D/A converter 38 are enabled during frame buffer read pulse so that the input signal from the n pixel may be corrected. The D/A 38 and comparator 42 are enabled for a time sufficient to preserve the input signal, to allow the D/A conversion to occur and to maintain a correction signal on the AGC 22 so that information is accurately presented to the A/D converter 28. Comparator 42 looks at the output 40 of the frame buffer 16 and the threshold Th 44 and produces an enable signal if DP<Th. If the enable signal is produced, the data from the AGC 22 is A/D converted and clocked into the register 34. If the threshold Th is exceeded, the comparator 42 produces no output and the current data from the n-1 pixel stored in the output register 34 remains therein. Thereafter, in either case, the data stored in the register 34 is then written into the frame buffer 16 in accordance with the frame buffer write input 36. The data on the output register 34 is stored therein until clocked out by the next enable signal from the comparator 42.

The arrangement of FIG. 2 is sequenced in a manner similar to the arrangement of FIG. 1 herein described. The exception is that the D/A feedback loop is not employed for the AGC 22.

The invention has then been described in accordance with particular embodiments. It should be understood, however, that other embodiments will be readily apparent to those skilled in the art and it is intended to cover such embodiments as fall within the true spirit and scope of the appended claims.

What is claimed is:

1. A defect correction apparatus for a solid state imaging device having an array of pixels for producing image scene pixel data when exposed to scene light comprising:

a frame buffer having memory locations corresponding to the pixels of the imaging device and being responsive for storing values of shuttered dark pixel data for each pixel in the corresponding memory locations prior to exposure of the image device to scene light;

register means responsively coupled to the imaging device and having an output coupled to the frame buffer for sequentially clocking dark pixel data into the frame buffer for storage and for subsequently clocking selected image pixel data into the corresponding frame buffer locations for replacing the dark pixel data with image pixel data of the scene; wherein the register means includes and analog-to-digital (A/D) converter for producing digital outputs in response to analog inputs representative of pixel data from corresponding elements of the imaging device;

a comparator having an output operatively coupled to the register means and being responsively coupled to the register means and being responsively coupled to the frame buffer for producing either an enable output for enabling the register means when the dark pixel data is less than a selected threshold indicative of an operative pixel or an inhibit output for inhibiting the register means when the dark pixel data is greater than the threshold indicative of an inoperative pixel, such that, the dark pixel data for a particular location is replaced in the buffer by image pixel data for a corresponding pixel when the pixel is operative an dark pixel data for such location is replaced by image pixel data from an operative pixel immediately prior to the defective pixel when the pixel is inoperative and means for adjusting the analog input to the A/D converter in accordance with the value of dark pixel data in the buffer for the corresponding element.

2. The defect correction apparatus of claim 1 wherein the register means includes an output storage register element responsive to the A/D converter for storing the data representative of the value of a pixel element when converted to digital data.

3. The defect correction apparatus of claim 2 wherein the register element is responsively coupled to the comparator for retaining the digital data representative of the value of a prior operative pixel element when the value of the dark pixel data is greater than the threshold whereby the image pixel data is not entered in the register element.

4. The defect correction of claim 3 wherein the A/D convertor is responsively coupled to the comparator and is either enabled when the dark pixel data is below the threshold or disabled when the dark pixel data is above the threshold.

5. The defect correction apparatus of claim 1 wherein the means for adjusting the analog input comprises an automatic control amplifier having one input responsively coupled to the imager and a second input inverted with respect to the first mentioned input and responsively coupled to the buffer.

6. The defect correction apparatus of claim 1 wherein the means for adjusting the analog input comprises a digital-to-analog (D/A) converter coupled to the buffer output for converting digital pixel data to analog values.

7. The defect correction apparatus of claim 1 wherein the imaging device is a CID.

8. The defect correction apparatus of claim 1 wherein the imaging device is a CCD.

* * * * *